(12) United States Patent
Li

(10) Patent No.: US 8,587,973 B2
(45) Date of Patent: Nov. 19, 2013

(54) INTERNAL HIGH-VOLTAGE CURRENT SOURCE IN AN AC/DC POWER CONVERTER

(75) Inventor: En Li, Hangzhou (CN)

(73) Assignee: Monolithic Power Systems, Inc., San Jose, CA (US)

( * ) Notice: Subject to any disclaimer, the term of this patent is extended or adjusted under 35 U.S.C. 154(b) by 918 days.

(21) Appl. No.: 12/634,029

(22) Filed: Dec. 9, 2009

(65) Prior Publication Data

US 2010/0214807 A1   Aug. 26, 2010

(30) Foreign Application Priority Data

Feb. 25, 2009   (CN) .......................... 2009 1 0058429

(51) Int. Cl.
  *H02M 3/24* (2006.01)
(52) U.S. Cl.
  USPC .............................. 363/97; 363/49

(58) Field of Classification Search
  USPC ...................... 363/34, 37, 49, 95, 97; 323/901
  See application file for complete search history.

(56) References Cited

U.S. PATENT DOCUMENTS

| | | | | |
|---|---|---|---|---|
| 5,812,383 A | * | 9/1998 | Majid et al. ................. | 363/21.05 |
| 6,002,598 A | * | 12/1999 | Seinen et al. .................. | 363/49 |
| 6,813,170 B2 | * | 11/2004 | Yang ........................... | 363/56.09 |

* cited by examiner

*Primary Examiner* — Jessica Han
(74) *Attorney, Agent, or Firm* — Perkins Coie LLP

(57) ABSTRACT

AC/DC power converters having an under voltage lockout circuit with first and second thresholds and associated methods of operation are disclosed herein. In one embodiment, the first threshold is greater than the second threshold. The under voltage lockout circuit is configured to enable a current source to charge the capacitor when the voltage across the capacitor is less than the second threshold. The under voltage lockout circuit is configured to shut off the current source and to enable a pulse width modulator circuit to switch a transistor when the voltage is greater than the first threshold.

2 Claims, 3 Drawing Sheets

INTERNAL HIGH-VOLTAGE CURRENT SOURCE IN AN AC/DC POWER CONVERTER

CROSS-REFERENCE TO RELATED APPLICATION(S)

This application claims priority to Chinese Application No. 200910058429.5, filed on Feb. 25, 2009, the disclosure of which is incorporated herein by reference in its entirety.

TECHNICAL FIELD

The present disclosure is related to electronic circuits, and more particularly, to Alternating Current to Direct Current (AC/DC) power converters.

BACKGROUND

FIG. 1 is a schematic diagram illustrating a conventional AC/DC power converter. In FIG. 1, components within dashed box 101 are integrated on a silicon die. An AC voltage is applied to input ports 102 and 104, and a regulated DC output voltage with respect to ground 108 is provided at output port 106. A transformer that includes primary winding 110 and secondary winding 112 is illustrated in FIG. 1, and the transformer also comprises another secondary winding 114 for charging capacitor 116 during steady state operation.

Various components within silicon die 101 require a rectified voltage for operation. During steady state operation, the voltage across capacitor 116 provides at node 122 the voltage needed by pulse width modulator (PWM) 118. During steady state operation, PWM 118 switches switching Metal Oxide Semiconductor Field Effect Transistor (nMOSFET) 120 at a rate sufficient to energize primary winding 110 so that a feedback voltage is adjusted to equal a reference voltage (not shown).

During start up, capacitor 116 has not yet been charged up, so that the voltage developed at node 122 is initially low, e.g., proximately equal to ground. To develop the voltage needed during startup, a high voltage internal current source is utilized. Node 122 is connected to the gate of nMOSFET 124 and to the source of nMOSFET 126. The source of nMOSFET 104 is biased by voltage source 128. With the voltage at node 122 low, nMOSFET 124 is off and nMOSFET 126 is on. With the drain of nMOSFET 126 connected to node 130, the drain of nMOSFET 126 is at a relatively high rectified voltage, so that nMOSFET 126 serves as a high voltage current source when on, sourcing current to capacitor 116 during startup.

When the voltage at node 122 is high enough to turn on nMOSFET 124, the gate of nMOSFET 126 is pulled low so that nMOSFET 126 is turned off. At this point, PWM 118 starts to operate so that the AC/DC converter enters into a steady state operating mode in which nMOSFET 120 is switched on and off to regulate the output voltage. During steady state operation, secondary winding 114 and diode 132 maintain capacitor 116 charged.

As clearly shown in FIG. 1, the circuit includes two high-voltage pins 134 and 136, connected to the drain of nMOSFET 126 and to the drain of nMOSFET 120, respectively. Manufacturing the individual high-voltage pins 134 and 136 on the silicon die can be expensive and complex. Accordingly, there is a need for a circuit with reduced complexity and cost of manufacturing.

DETAILED DESCRIPTION

This disclosure describes embodiments of electric circuits and associated methods for AC/DC converters. Several of the details set forth below (e.g., example circuits and example values for these circuit components) are provided to describe the following embodiments and methods in a manner sufficient to enable a person skilled in the relevant art to practice, make, and use them. As used herein, a "current source" may include a current source or a current sink. Several of the details and advantages described below, however, may not be necessary to practice certain embodiments and methods of the technology. A person of ordinary skill in the relevant art, therefore, will understand that the technology may have other embodiments with additional elements, and/or may have other embodiments without several of the features shown and described below with reference to FIGS. 2 and 3.

Figure 1:
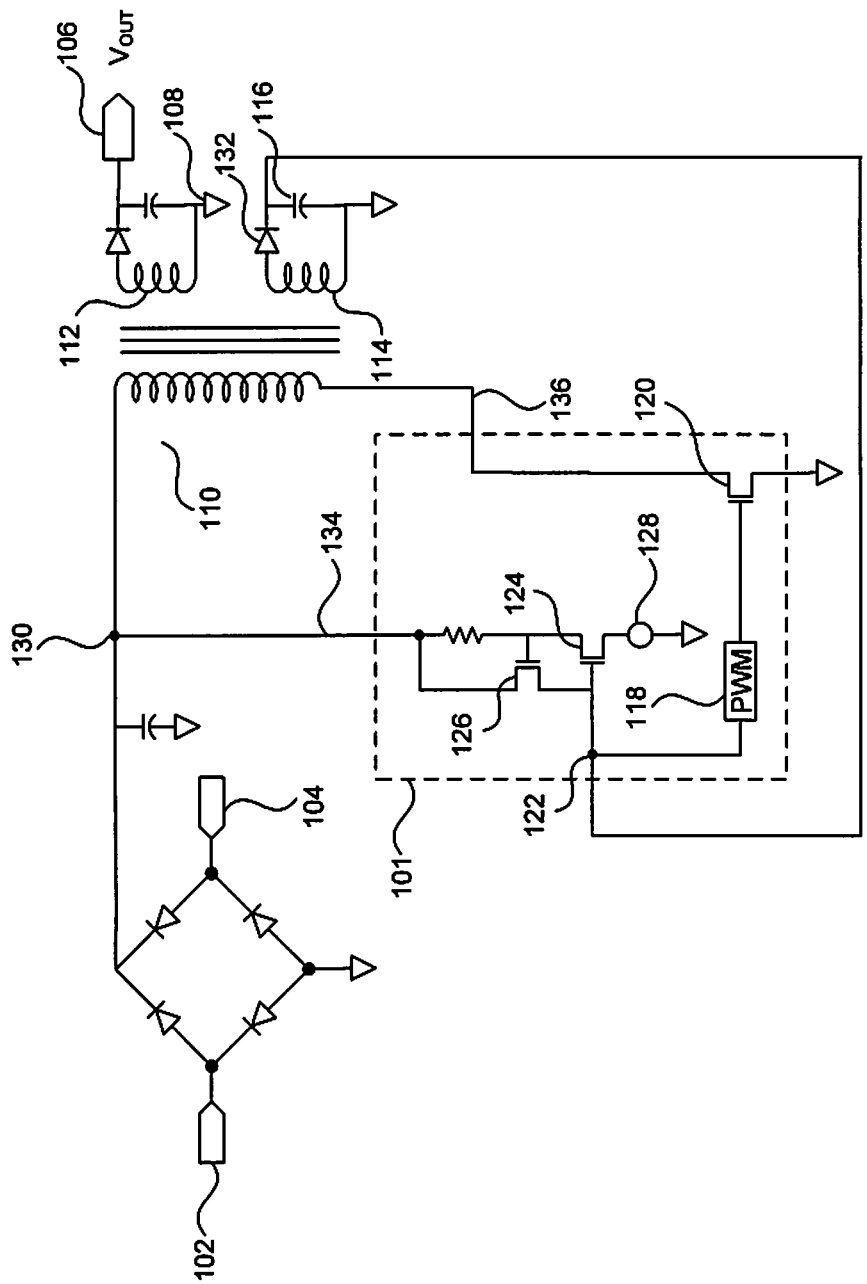
FIG. 1 is a schematic diagram of an AC/DC power converter according to the prior art.
Figure 2:
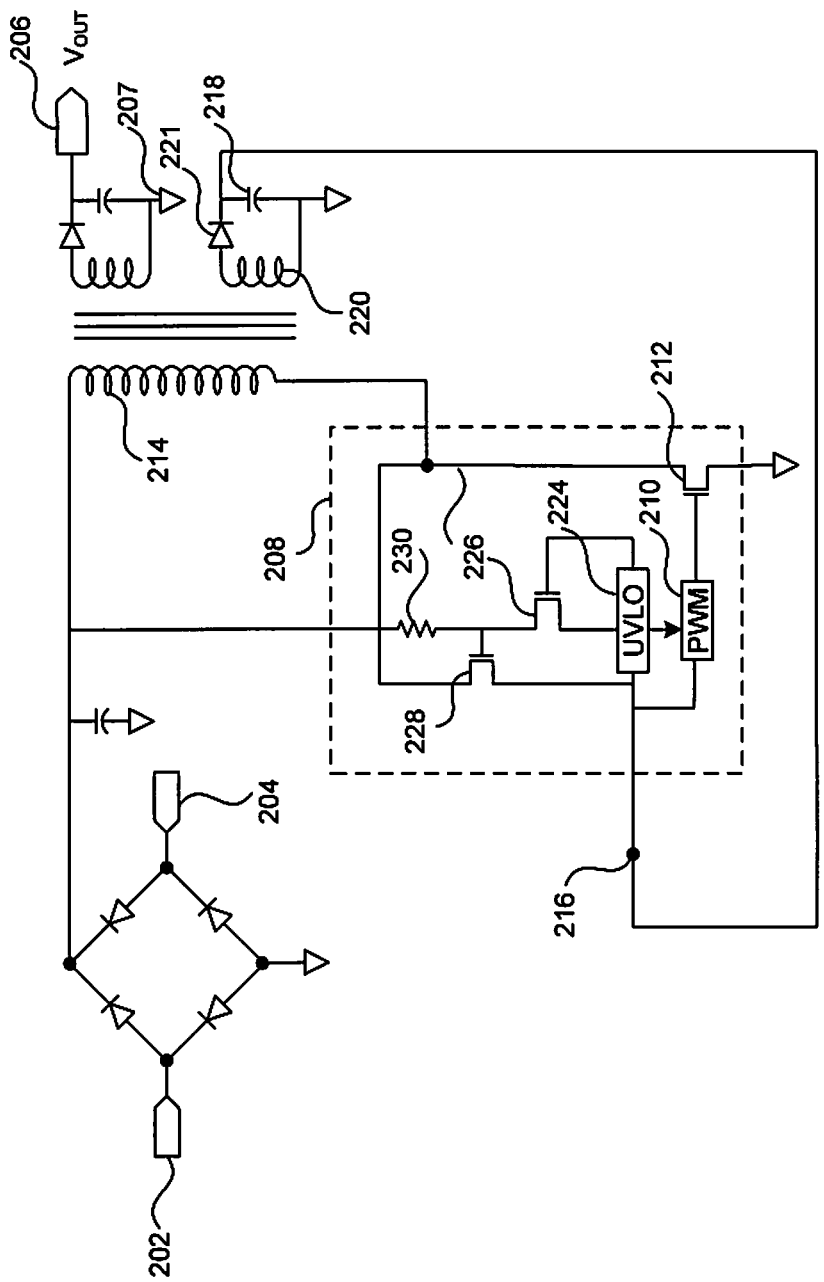
FIG. 2 is a schematic diagram of an AC/DC power converter according to embodiments of the disclosure.

FIG. 2 is a schematic diagram of an AC/DC power converter according to embodiments of the disclosure. As shown in FIG. 2, an input AC source is applied to input ports 202 and 204, and a rectified and regulated output voltage is provided at output port 206. The output voltage may be referenced to ground 207 or some other desired value. Components within dashed line 208 may be integrated on a silicon die/chip. During steady state operation, PWM 210 switches switching nMOSFET 212 at a rate sufficient to energize primary winding 214 so that a feedback voltage is adjusted to equal a reference voltage. Generation of the feedback and reference voltages is not described in detail for clarity. During steady state operation, the combination of secondary winding 220 and diode 221 charges capacitor 218, and the voltage across capacitor 218 provides a sufficiently high rectified voltage at node 216 for certain components of silicon die 208.

Functional block 224 generally indicates an Under Voltage Lock Out (UVLO) unit. UVLO is configured to compare the voltage at node 216 (the voltage across capacitor 218) first and second thresholds. The first threshold is greater than the second threshold. When the AC/DC converter of FIG. 2 is first turned on, capacitor 218 has not yet been charged up. Thus, the voltage at node 216 may be less than the first threshold. As a result, UVLO 224 prevents PWM 210 from switching on nMOSFET 212, and the gate voltage of nMOSFET 226 is at a value such that nMOSFET 226 is off.

The drain of nMOSFET 226 is connected to the gate of transistor 228 and that of resistor 230. Resistor 230 and the drain of transistor 228 are connected to primary winding 214. In the particular embodiment of FIG. 2, transistor 228 is a JFET (Junction Field Effect Transistor). In other embodiments, the transistor 228 may also include a MOSFET, a bi-polar transistor, and/or other suitable types of transistor.

With nMOSFET 226 off, when the voltage at node 216 is less than the second threshold, transistor 228 is biased by resistor 230 to be on so that current flowing through primary winding 214 may be used to charge capacitor 218. As capacitor 218 charges, the voltage at node 216 rises above the second threshold, and then above the first threshold. When the voltage at node 216 rises above or equal to the first threshold, ULVO 224 enables PWM 210 to switch nMOSFET 212 on and off. If the voltage at node 216 can be maintained above the second threshold, steady state operation begins, and UVLO 224 outputs a high voltage to turn on the gate of nMOSFET 226. This pulls down the gate voltage of transistor 228, turning transistor 228 off.

When the voltage at node 216 rises above the first threshold for the first time during startup, the voltage at node 216 falls back to the second threshold when PWM 210 is first enabled to switch nMOSFET 212. In this case, PWM 210 is disabled and the voltage at node 216 rises again, eventually crossing (or reaching) the first threshold. Such a cycle, in which PWM 210 is enabled and disabled by ULVO 224, may occur more than once. However, eventually steady state operation is reached. The voltage at node 216 is maintained above the second threshold, PWM 210 is enabled to switch nMOSFET 212 on and off, and transistor 228 is maintained off.

Accordingly, transistor 228 serves as a high voltage current source to provide a relatively high rectified voltage to silicon die 208 when capacitor 218 has not yet been charged up, and to source current to capacitor 218 during start up. This high voltage current source is turned off once the capacitor 218 has been charged to a voltage exceeding the second threshold.

One feature of several embodiments of the circuit in FIG. 2 is that the circuit in FIG. 2 operates with hysteresis with the first threshold greater than the second threshold. For example, once the voltage at node 216 has risen above the first threshold, the embodiment does not change state until the voltage at node 216 drops below the second threshold, in which case UVLO 224 prevents PWM 210 from switching nMOSFET 212, as illustrated in FIG. 3.

Figure 3:
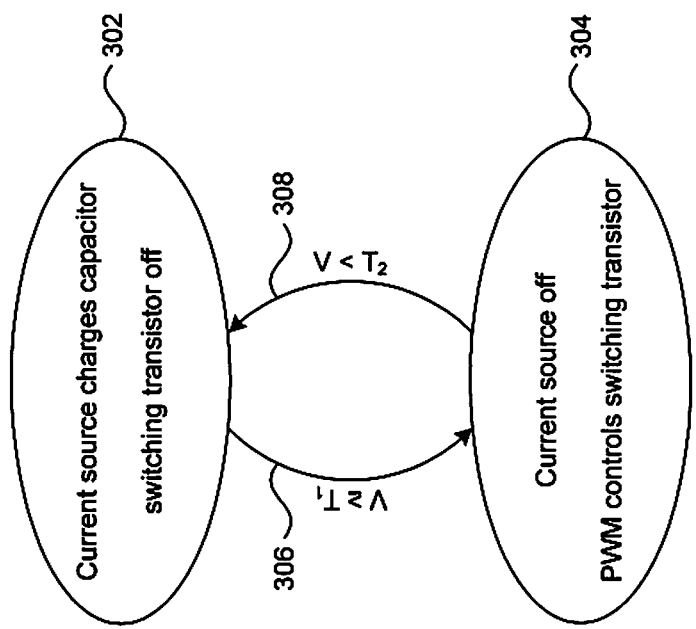
FIG. 3 is a state diagram of the AC/DC power converter in FIG. 2.

FIG. 3 is a state diagram of the AC/DC power converter in FIG. 2. As shown in FIG. 3, in state 302, transistor 228 is on to charge capacitor 218, and nMOSFET 226 is off. The term "current source" is used in FIG. 3 instead of specifically referring to transistor 228, because other embodiments may use a different arrangement of transistors to serve as a current source. In state 302, nMOSFET 212, referred to as a switching transistor in FIG. 3, is off. In state 304, the current source is off (e.g., transistor 228 in FIG. 2 is off) and PWM 210 is now enabled to switch nMOSFET 212 (switching transistor) on and off. The circuit transitions from state 302 to state 304 when the voltage at node 206 is greater than or equal to the first threshold, $T_1$, indicated as event 306. The circuit transitions from state 304 and to state 302 when the voltage at node 216 is less than a second threshold, $T_2$, indicated as event 308. The relationship for hysteresis is $T_1 > T_2$.

In practice, the values of $T_1$ and $T_2$ may not be constant in time. For example, the values for the first and second thresholds may vary in time due to temperature and/or other variations in the circuit components of UVLO 224. Furthermore, the relationship between the voltage at node 216 and the thresholds used to define events 306 and 308 may be different from other embodiments. For example, in some embodiments, event 306 may occur when the voltage at node 216 is greater than the first threshold, and event 308 may occur when the voltage at node 216 is less than or equal to $T_2$. In other embodiments, events 306 and 308 may occur under other suitable conditions.

It is to be understood in this disclosure that the meaning of "A is connected to B", where for example A or B may be, but are not limited to, a node, a device terminal, or a port, is that A and B are electrically connected to each other by a conductive structure so that for frequencies within the signal bandwidth of interest, the resistance, capacitance, and inductance introduced by the conductive structure may each be neglected. For example, a transmission line (e.g., microstrip), relatively short compared to the signal wavelength of interest, may be designed to introduce a relatively small impedance, so that two devices in electrical contact at each end of the transmission line may be considered to be connected to one another.

It is also to be understood in this disclosure that the meaning of "A is coupled to B" is that either A and B are connected to each other as described above, or that, although A and B may not be connected to each other as described above, there is nevertheless a device or circuit that is connected to both A and B so that a properly defined voltage or current at one of the two elements A or B has some effect on a properly defined voltage or current at the other of the two elements. For example, A may be one port of a microwave structure and B may be a second port of the microwave structure, where the voltages at ports A and B, defined as the transverse electric fields at ports A and B, respectively, are related to each other by a transfer function. Although the microwave structure may introduce non-negligible impedance, the elements A and B may be considered to be coupled to one another.

From the foregoing, it will be appreciated that specific embodiments of the disclosure have been described herein for purposes of illustration, but that various modifications may be made without deviating from the disclosure. Certain aspects of the disclosure described in the context of particular embodiments may be combined or eliminated in other embodiments. Not all embodiments need necessarily exhibit such advantages to fall within the scope of the disclosure. Accordingly, the disclosure is not limited except as by the appended claims.

I claim:
1. A power converter comprising:
a primary winding;
a secondary winding magnetically coupled to the primary winding;
a capacitor coupled to the secondary winding, the capacitor having a voltage across the capacitor;
an under voltage lockout circuit coupled to the capacitor;
a first transistor coupled to the primary winding;
a pulse width modulator coupled to the switching transistor and to the under voltage lockout circuit; and
a second transistor having a gate coupled to the under voltage lockout circuit, a first terminal coupled to the primary winding, and a second terminal connected to the capacitor;
wherein the under voltage lockout circuit has a first threshold and a second threshold, the first threshold being greater than the second threshold, and wherein the under voltage lockout circuit is configured to cause the pulse width modulator to stop switching the first transistor and to turn on the second transistor if the voltage across the capacitor is less than the second threshold, and wherein the under voltage lockout circuit is also configured to enable the pulse width modulator to switch the first transistor and to turn off the second transistor if the voltage across the capacitor is greater than the first threshold.

2. The power converter of claim 1, wherein the under voltage lockout circuit is configured to cause the pulse width modulator to stop switching the first transistor and to turn on the second transistor if, and only if, the voltage across the capacitor is less than the second threshold, and wherein the under voltage lockout circuit is also configured to enable the pulse width modulator to switch the first transistor and to turn off the transistor if and only if the voltage across the capacitor is greater than or equal to the first threshold.

* * * * *